(12) United States Patent
Yoneda

(10) Patent No.: US 7,260,619 B2
(45) Date of Patent: *Aug. 21, 2007

(54) METHOD AND APPARATUS FOR SUPPLYING INFORMATION, AND STORAGE MEDIUM ON WHICH AN INFORMATION SUPPLYING PROGRAM IS STORED

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 331 days.

This patent is subject to a terminal disclaimer.

(21) Appl. No.: 11/081,599

(22) Filed: Mar. 17, 2005

(65) Prior Publication Data

US 2005/0160119 A1    Jul. 21, 2005

Related U.S. Application Data

(63) Continuation of application No. 09/537,074, filed on Mar. 28, 2000, now Pat. No. 6,880,008.

(30) Foreign Application Priority Data

Mar. 31, 1999  (JP)  ................. 11-092662

(51) Int. Cl.
    *G06F 15/16*  (2006.01)

(52) U.S. Cl. .................. 709/219; 709/203; 709/229; 709/246; 709/248; 707/3; 707/10; 707/203; 707/204; 714/6

(58) Field of Classification Search ................ 709/203, 709/217, 219, 226, 229, 246, 248; 707/3, 707/10, 203, 204; 714/6
See application file for complete search history.

(56) References Cited

U.S. PATENT DOCUMENTS 5,163,148 A    11/1992  Walls
5,544,360 A     8/1996  Lewak et al.
(Continued)

FOREIGN PATENT DOCUMENTS

JP          05012341 A      1/1993
(Continued)

*Primary Examiner*—Oanh Duong
(74) *Attorney, Agent, or Firm*—Oblon, Spivak, McClelland, Maier & Neustadt, P.C.

(57) ABSTRACT

A method and apparatus for supplying information, and a storage medium on which an information supplying program is stored are disclosed, in which backup files of Web pages which were laid open in the past and those which will be laid open in the future are stored in a WWW server so that any Web page can be presented to a client in response to a request issued by the client. WWW server creates a file name used as a key when being retrieved, by adding data representing updating date and time at the end of an original file name of a Web page stored in an open storage area of an HDD which is allowed to be freely accessed via the Internet. The created file name serving as a key in retrieval is assigned to a backup data created from update data, and the backup data is stored in a retrieval storage area. In response to a request issued by a client via the Internet, the WWW server retrieves backup data having a file name corresponding to specified date and time from the retrieval storage area and transfers the retrieved backup data to the client.

2 Claims, 11 Drawing Sheets

U.S. PATENT DOCUMENTS

| | | |
|---|---|---|
| 5,796,945 A | 8/1998 | Tarabella |
| 5,819,261 A * | 10/1998 | Takahashi et al. ............. 707/3 |
| 5,991,760 A | 11/1999 | Gauvin et al. |
| 6,003,043 A | 12/1999 | Hatakeyama et al. |
| 6,061,686 A | 5/2000 | Gauvin et al. |
| 6,105,028 A | 8/2000 | Sullivan et al. |
| 6,148,412 A | 11/2000 | Cannon et al. |
| 6,151,609 A | 11/2000 | Truong |
| 6,167,567 A | 12/2000 | Chiles et al. |
| 6,240,550 B1 | 5/2001 | Nathan et al. |
| 6,243,662 B1 | 6/2001 | Hashimoto |
| 6,247,141 B1 | 6/2001 | Holmberg |
| 6,266,784 B1 | 7/2001 | Hsiao et al. |
| 6,278,992 B1 | 8/2001 | Curtis et al. |
| 6,321,251 B1 | 11/2001 | Deisinger et al. |
| 6,466,940 B1 | 10/2002 | Mills |
| 6,487,557 B1 | 11/2002 | Nagatomo |
| 6,615,244 B1 * | 9/2003 | Singhal ...................... 709/213 |
| 6,629,109 B1 | 9/2003 | Koshisaka |
| 6,880,008 B1 * | 4/2005 | Yoneda ...................... 709/226 |
| 2002/0018547 A1 | 2/2002 | Takae et al. |
| 2002/0023226 A1 * | 2/2002 | Takagi ........................ 713/201 |
| 2002/0107877 A1 * | 8/2002 | Whiting et al. ............. 707/204 |

FOREIGN PATENT DOCUMENTS

| | | | |
|---|---|---|---|
| JP | 06153140 A | | 5/1994 |
| JP | 08153054 A | | 6/1996 |
| JP | 10240604 A | | 9/1998 |
| JP | 10254969 A | | 9/1998 |
| JP | 11015716 A | | 1/1999 |
| JP | 11175380 A | | 7/1999 |
| JP | 11184810 A | | 7/1999 |
| JP | 2000056784 A | * | 2/2000 |
| JP | 2000259456 A | | 9/2000 |

* cited by examiner

FIG. 7

```
┌─────────────────────────────────────────────────────────┐ 50
│ ⌬ HOME PAGE UPDATING SYSTEM - Microsoft Internet Explorer  _□×│
│ FILE(F)  EDIT(E)  DISPLAY(V)  FAVORITES(A)  TOOLS(T)  HELP(H) │
│  ⇐   ⇒   ⊗     ⮂     ⌂      ⊙       ▢       ⏲        │
│ BACK FORWARD CANCEL UPDATE HOME RETRIEVE FAVORITES HISTORY │
│ ADDRESS(D)  ⌬ A:¥updatesytem.htm              ▼  ↻ MOVE │
│─────────────────────────────────────────────────────────│
│  HOME PAGE UPDATING SYSTEM                              │
│─────────────────────────────────────────────────────────│
│  HTML FILE IS GOING TO BE TRANSFERRED                   │
│                                        ─51             │
│  NAME OF HTML FILE   ┌──────────┬────────┐             │
│  TO BE TRANSFERRED:  │index.html│ SEARCH │             │
│                      └──────────┴────────┘             │
│  UPDATING DATE :   ⦿ PRESENT   ○ FUTURE               │
│                      └53a        └53b                   │
│─────────────────────────────────────────────────────────│
│  ENTER THE UPDATING DATE IF IT IS A FUTURE TIME         │
│                                                         │
│  [0000] YEAR  [00] MONTH  [00] DAY  │TRANSFER HTML FILE│~52│
│   └54a         └54b        └54c                         │
│─────────────────────────────────────────────────────────│
│ ⌬ PAGE IS DISPLAYED                    ▣ MY COMPUTER   │
└─────────────────────────────────────────────────────────┘
```

FIG. 8

```
<HTML>
<HEAD>
<TITLE>HOME PAGE UPDATING SYSTEM</TITLE>
</HEAD>
<BODY>
<H1>HOME PAGE UPDATING SYSTEM</H1>
<HR>
HTML FILE IS GOING TO BE TRANSFERRED<P>
<FROM ENCTYPE="multipart/form-data" ACTION="/cgi-bin/update.cgi" METHOD=POST>
NAME OF HTML FILE TO BE TRANSFERRED: <INPUT name=data type=file><P>
UPDATING DATE : <INPUT name=now type=radio > PRESENT < INPUT name=now type=radio>FUTURE<P>
<HR>
ENTER THE UPDATING DATE IF IT IS A FUTURE TIME <P>
<INPUT TYPE="TEXT" NAME="year" VALUE="0000" SIZE=4>YEAR
<INPUT TYPE="TEXT" NAME="month" VALUE="00" SIZE=2>MONTH
<INPUT TYPE="TEXT" NAME="date" VALUE="00" SIZE=2>DAY
<INPUT type=submit value=TRANSFER HTML FILE><P>
</FROM>
<HR>
</BODY>
</HTML>
```

FIG. 12

```
<HTML>
<HEAD>
<TITLE>INDEX.HTML ISSUED ON THE SPECIFIED DATE WILL BE DISPLAYED</TITLE>
</HEAD>
<BODY>
<H1>INDEX.HTML ISSUED ON THE SPECIFIED DATE WILL BE DISPLAYED</H1>
<HR>
<FROM ACTION="/cgi-bin/pageview.cgi" METHOD=POST>
ENTER THE DATE OF FILES YOU WANT TO READ
<INPUT TYPE="TEXT" NAME="year" VALUE="0000" SIZE=4>YEAR
<INPUT TYPE="TEXT" NAME="month" VALUE="00" SIZE=2>MONTH
<INPUT TYPE="TEXT" NAME="date" VALUE="00" SIZE=2>DAY
<INPUT TYPE="TEXT" NAME="hour" VALUE="00" SIZE=2>HOUR
<INPUT TYPE="TEXT" NAME="minute" VALUE="00" SIZE=2>MINUTE<P>
<INPUT TYPE="submit" VALUE="BROWSE"><P>
</FROM>
<HR>
</BODY>
</HTML>
```

METHOD AND APPARATUS FOR SUPPLYING INFORMATION, AND STORAGE MEDIUM ON WHICH AN INFORMATION SUPPLYING PROGRAM IS STORED

This Application is a Continuation of application Ser. No. 09/537,074 filed on Mar. 28, 2000 now U.S. Pat. No. 6,880,008.

BACKGROUND OF THE INVENTION

1. Field of the Invention

The present invention relates to an information supplying method, a medium including an information supplying program stored thereon, and an information supplying apparatus, which are advantageous in particular when being applied to a WWW (World Wide Web) server for supplying, to a client via a net work, a requested HTML (Hyper Text Markup Language) file and a JPEG (Joint Photographic Experts Group) image linked to that HTML file.

2. Description of the Related Art

Net surfing is now very popular. A lot of people are enjoying accessing various WWW servers via the Internet using a WWW (World Wide Web) browser running on a personal computer to read character information and associated image information of Web pages (also referred to as home pages) or listen to audio files such as a music file supplied from WWW servers.

To access a desired Web page, a user operates a personal computer on which a WWW browser is running so as to send a message to a WWW server to request that an index file in the HTML (Hyper Text Markup Language) format and an image file linked to that HTML file be transmitted.

Hereinafter, Web page files including an index file and other files such as an image files linked to the index file are collectively referred to as an HTML file.

In WWW systems, any Web page is specified by an address called a URL (Uniform Resource Locator) which uniquely identifies a file on the Internet. Each URL consists of a scheme name, a domain name (host name), and a file name. For example, in the case of a URL "http://www.test.com/index.html", its scheme name is "http" (Hyper Text Transfer Protocol), and its domain name and file name are "www.test.com" and "index.html", respectively. In practice, access to a WWW server is performed in accordance with an IP address which is acquired on the basis of the domain name. More specifically, before accessing the WWW server, the WWW browser acquires the IP address of the WWW server by asking a DNS (Domain Name Server) about the IP address.

If a WWW server receives a request for an HTML file specified by a URL, the WWW server transfers via the Internet a Web page including the requested HTML file and other files such as an image file linked to that HTML file to the personal computer which has issued the request (that is, to the personal computer which is accessing the WWW server).

Upon reception of the Web page including the HTML file and other files such as an image file linked to that HTML file, the personal computer displays character information contained in the HTML file and image information linked to the HTML file on the screen of the WWW browser running on the personal computer.

When a user has his/her own Web page stored in a WWW server managed by an Internet service provider or the like, if the user updates his/her Web page via a network, the Web page including HTML files (index.html, for example) currently stored in the WWW server is generally overwritten, that is replaced, with new data except for the case where a Web page is uploaded for the first time. Also in the case where an Internet service provider updates an existing Web page being open to clients, the existing Web page is generally overwritten with a new Web page.

If HTML files (index.html, for example) of Web pages are kept fresh by performing updating in the above-described manner, users can read a Web page including newest information simply by inputting the same URL (for example, "http://www.test.com/index.html") or by specifying the same URL using a bookmark capability of a WWW browser.

Although updating of HTML files (index.html, for example) of Web pages stored in a WWW server to newest data at an arbitrary time brings about an advantage that clients can access newest information, a disadvantage is in that when a client requests a Web page which was available in a past period but not available now, the WWW server cannot present such a Web page to the client.

In view of the above, it is an object of the present invention to provide a technique of automatically creating a backup file of a past Web page or a Web page which will be released in the future and saving it in a WWW server thereby making it possible to present it to a client in response to a request issued by the client.

SUMMARY OF THE INVENTION

According to an aspect of the present invention, there is provided a method of supplying information, comprising: a data updating step in which data stored in an open storage area allowed to be freely accessed via a network is replaced with update data at a specified time; a data backing-up step in which a retrieval file name is produced by adding data, which represents a date and time when updating should be performed, to the file name of the update data, the file name is assigned to backup data produced from the update data, and the backup data is saved in a retrieval storage area; and a retrieving step in which backup data having a file name corresponding to an updating time specified via the network is retrieved from the retrieval storage area, and the retrieved data is transferred via the network to a client which has requested the data.

According to another aspect of the present invention, there is provided a storage medium on which an information supplying program is stored, wherein the information supplying program comprises: a data updating step in which data stored in an open storage area allowed to be freely accessed via a network is replaced with update data at a specified time; a data backing-up step in which a retrieval file name is produced by adding data, which represents a date and time when updating should be performed, to the file name of the update data, the file name is assigned to backup data produced from the update data, and the backup data is saved in a retrieval storage area; and a retrieving step in which backup data having a file name corresponding to an updating time specified via the network is retrieved from the retrieval storage area, and the retrieved data is transferred via the network to a client which has requested the data.

According to still another aspect of the present invention, there is provided an information supplying apparatus comprising: a data updating apparatus for replacing data stored in an open storage area, which is allowed to be freely accessed via a network, with update data at a specified time; a data backing-up apparatus for producing a retrieval file name by adding data, which represents a date and time when updating should be performed, to the file name of the update data, assigning the retrieval file name to the backup file produced from the update data, and saving the backup file in a retrieval storage area; and a retrieving apparatus for searching the retrieval storage area for backup data having a file name corresponding to an updating time specified via the network and transferring the retrieved data via the network to a client which has requested the data.

In the information supplying method, the storage medium on which the information supplying program is stored, and the information supplying apparatus according to the present invention, data stored in an open storage area allowed to be freely accessed via a network is replaced with update data at a specified time. A file name used as a key when being retrieved is created by adding data representing the updating time to the original file name of the update data. The created file name serving as a key in retrieval is assigned to backup data created from the update data, and the backup data is stored in a retrieval storage area. In response to a request issued by a client via the Internet, the WWW server retrieves backup data having a file name corresponding to a specified date and time from the retrieval storage area and transfers the retrieved backup data to the client.

BRIEF DESCRIPTION OF THE DRAWINGS

FIG. 7 illustrates a WWW browser screen displayed on a personal computer;

FIG. 8 illustrates a source of an HTML file used to display a screen on a personal computer in such a manner as shown in FIG. 7;

FIG. 12 illustrates a source of an HTML file used to display a WWW browser screen on a personal computer to input an updating command;

DESCRIPTION OF THE PREFERRED EMBODIMENTS

Figure 1:
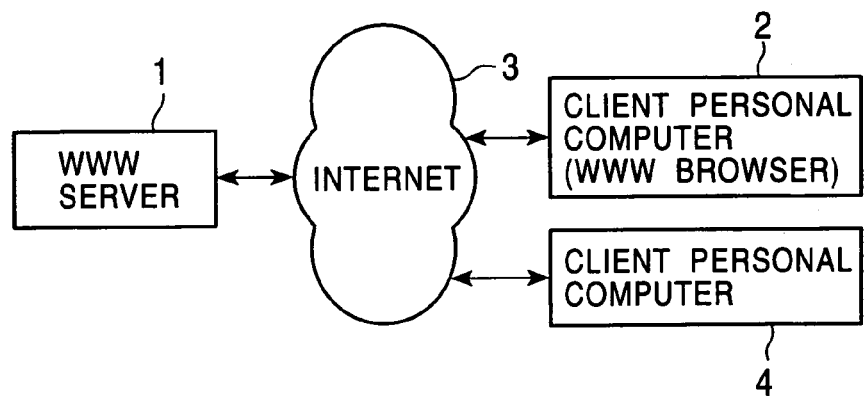
FIG. 1 is a schematic diagram illustrating an embodiment of an information supplying system according to the present invention.

FIG. 1 is a schematic diagram illustrating an embodiment of an information supplying system according to the present invention.

A WWW server 1 has prerecorded Web pages including various HTML files and also image files, audio files, and program files linked to the HTML files.

A WWW browser is running on a client personal computer 2 connected to the WWW server 1 via the Internet 3. When a user wants to read a particular Web page, the user operates the personal computer 2 on which the WWW browser is running so as to transmit a message to the WWW server 1 to request transmission of a Web page including an HTML file (index.html) specified by a URL (http://www-.test.com/index.html) and other files such as an image file lined to that HTML file.

Upon reception of the request from the personal computer 2, the WWW server 1 transfers the Web page including the HTML file (index.html) specified by the URL described in the request message and other files such as an image file linked to that HTML file, to the personal computer 2 which has issued the request.

If the personal computer 2 receives the Web page including the HTML file and other files such as an image file linked to the HTML file, the personal computer 2 displays character information described in the HTML file and also image information associated with the HTML on the display screen of the WWW browser running on the personal computer 2.

When a user has his/her own Web page stored in the WWW server 1 managed by an Internet service provider or the like, if the user updates his/her Web page via the Internet 3 by operating his/her own personal computer 4, the Web page including HTML files (index.html, for example) currently stored in the WWW server 1 is replaced with new data by means of overwriting, except for the case where the Web page is uploaded for the first time.

Figure 2:
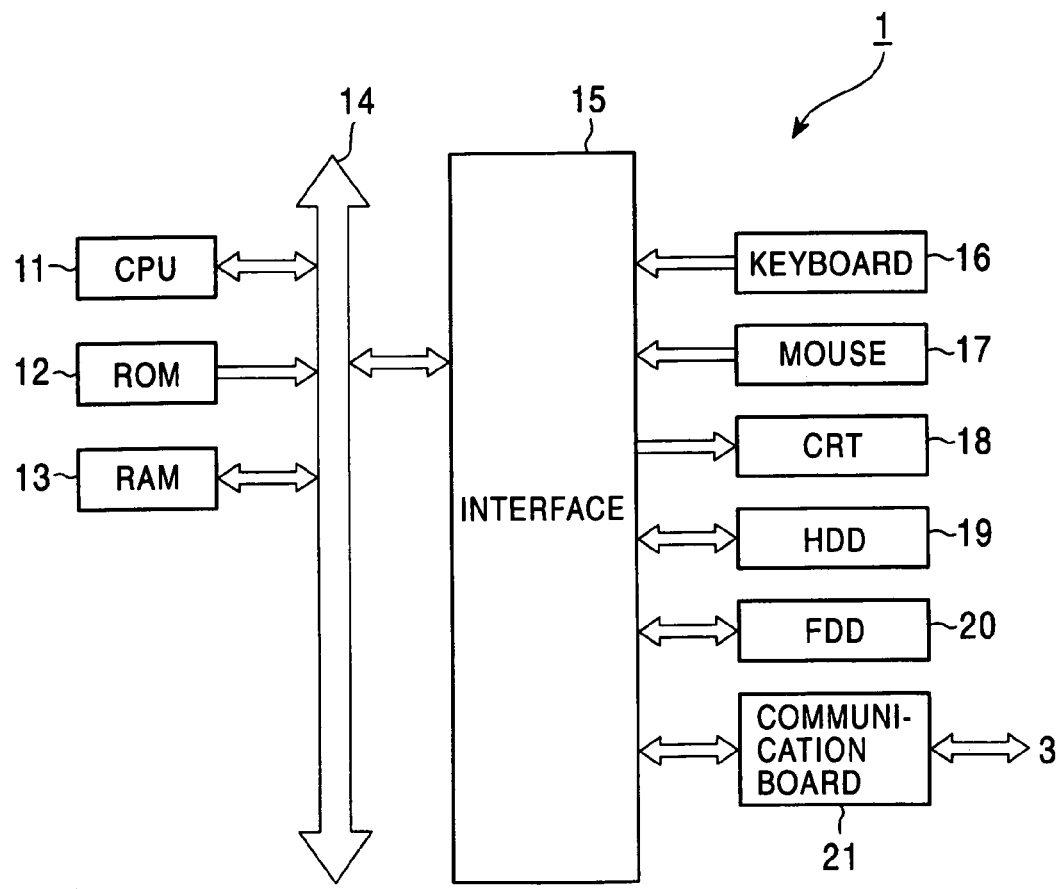
FIG. 2 is a block diagram illustrating the configuration of a personal computer.
Figure 3:
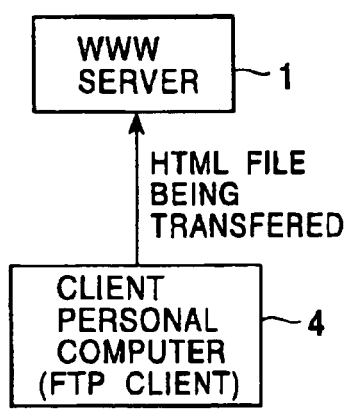
FIG. 3 is a schematic representation of a conventional process of updating a file stored in a WWW server using an FTP client program.

FIG. 2 is a block diagram illustrating the configuration of the WWW server 1. A CPU (central processing unit) 11 executes a basic OS (operating system). Furthermore, in order to provide various services, the CPU executes, upon the OS, various application programs such as CGI (Common Gateway Interface) and HTTPd (HTTPdaemon) which automatically responds to a request from a client and transfers a requested Web page to the IP address of the client in accordance with the HTTP (Hyper Text Transfer Protocol). A ROM (read only memory) 12 stores fixed basic data such as a BIOS program and parameters used by the CPU 11 in operations. A RAM (random access memory) 13 is used to store a program executed by the CPU 11 and also a parameter which varies during the execution of the program. These parts are connected to the CPU 11 via a bus 14.

A keyboard 16 is used by a user to input various commands such as a URL to the CPU 11. A mouse 17 is used by the user to point to a point on the screen of a CRT (cathode ray tube) 18 and select it. The CRT displays various kinds of information in the form of a text or an image. An HDD (hard disk drive) 19 and an FDD (floppy disk drive) 20 drive a hard disk and a floppy disk, respectively, so as to write or read an application program such as CGI and various data under the control of the CPU 11.

A communication board 21 is a device such as an Ethernet board, which is widely used in various companies, for connection with the network 3.

The above-described parts from the keyboard 16 to the communication boards 21 are connected to an interface 15. The interface 15 is connected to the CPU 11 via the bus 14.

The personal computers 2 and 4 have a similar configuration to that of the WWW server 1, and thus their hardware configuration is not described herein. As for the communication board 21 used in the personal computer 2 or 4, a modem for connection with an Internet service provider is generally used in home, although the Ethernet board is widely used in companies.

An operation performed by a user of the personal computer 4 to update an HTML file of a Web page stored in the WWW server 1 via the network 3 is now described below.

First, a user who wants to produce a Web page turns on the power of his/her personal computer 4 and starts Web page making software or a text editor to describe the content of a new Web page into a file in the HTML format.

The user then operates the personal computer 4 so as to upload the HTML file to the WWW server 1 thereby updating the Web page.

Two methods of uploading a Web page are described below. Note that the present invention employs a second method in which a Web page is updated using a file uploading capability of a WWW browser in cooperation with a CGI program of a WWW server.

A first and most common method is to use an FTP (File Transfer Protocol) client program.

In this method, the user transfers the HTML file to the WWW server 1 by running the FTP client program on the personal computer 4.

Figure 4:
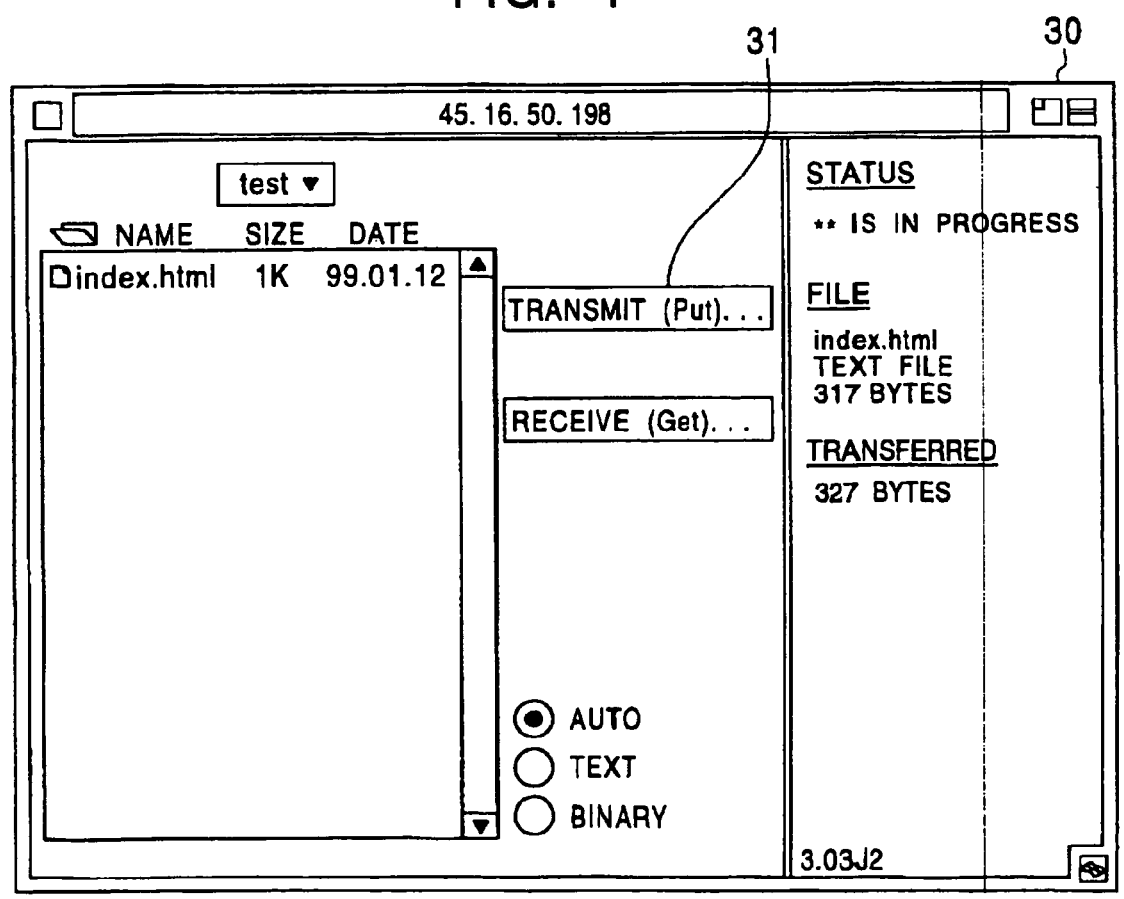
FIG. 4 is a schematic diagram illustrating a conventional display screen used to transfer a file using an FTP client program.
Figure 5:
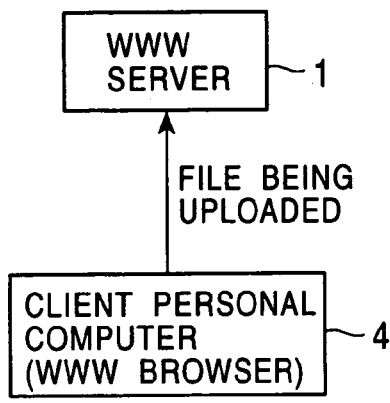
FIG. 5 is a schematic representation of a conventional process of uploading a file using a WWW browser.

More specifically, the user specifies an HTML file (index.html, for example) to be uploaded, by inputting its file name in the file transfer screen 30 of the FTP client program shown in FIG. 4. The user further specifies a directory of the WWW server 1 where the HTML file is to be stored and clicks a transmission button labeled "TRANSMIT (PUT)". In response, the HTML file is transferred to the WWW server 1.

Upon receipt of the HTML file (index.html, for example), the WWW server 1 overwrites the existing HTML file (index.html, for example) in the specified directory with the received HTML file.

Now the second method of updating a Web page is described. In this method, updating of a Web page is performed using a file uploading capability of a WWW browser in cooperation with a CGI program of the WWW server 1.

Figure 6:
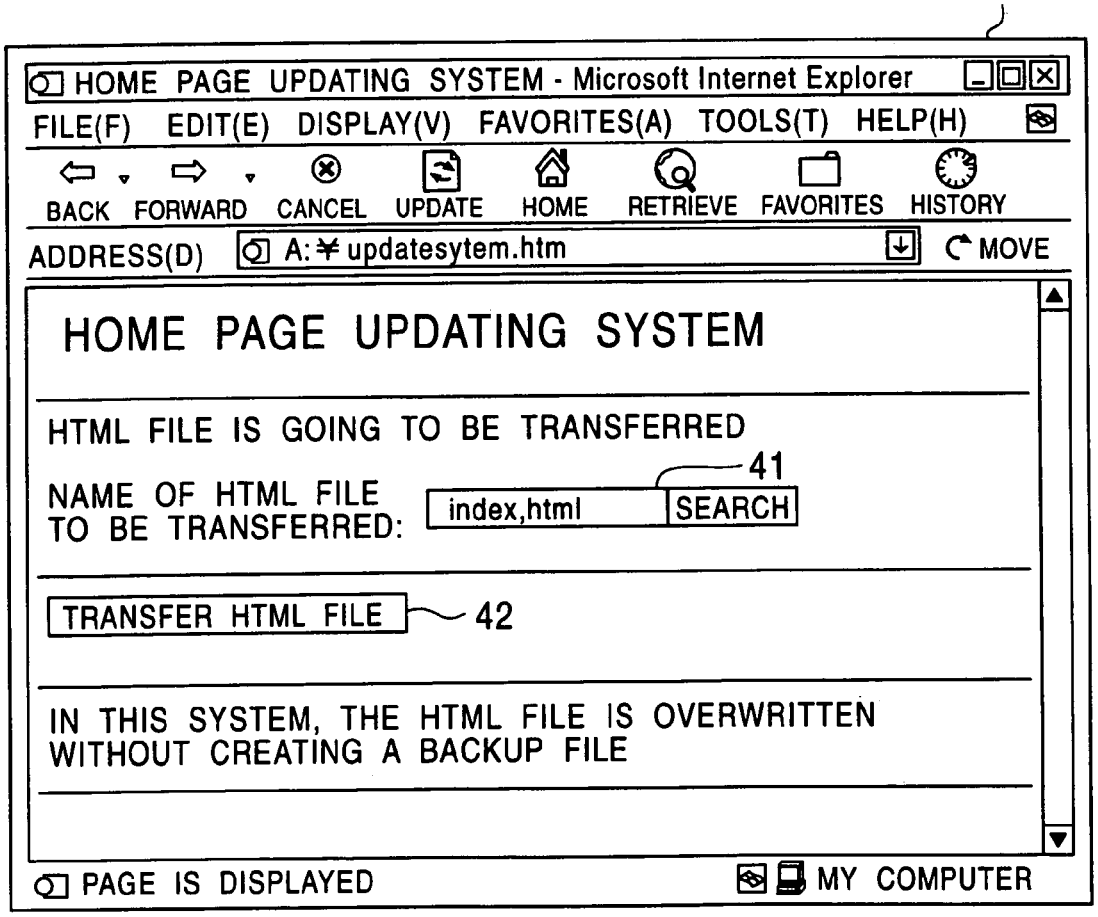
FIG. 6 is a schematic diagram illustrating a conventional display screen of a WWW browser for transferring a file using.

In this method, a user inputs the file name (index.html, for example) of an HTML file to be uploaded into a file name field 41 displayed on the screen 40 of the WWW browser shown in FIG. 6 thereby specifying the file name of the HTML to be transferred. The user then clicks a transfer button 42 labeled "TRANSFER HTML FILE" to transfer the specified HTML file to the WWW server 1. Upon reception of the HTML file (index.html, for example), the WWW server 1 overwrites the existing HTML file (index.html, for example) stored in a predetermined directory with the received HTML file in accordance with a predetermined file updating CGI program.

In this invention, as described earlier, the second method is employed in which a Web page is updated using the file uploading capability of the WWW browser in cooperation with the CGI program of the WWW server.

FIG. 7 illustrates an example of a display screen of the client personal computer 4 in the information supplying system according to the present invention. A user inputs an HTML file name (index.html, for example) to be uploaded, into a file name field 51 of the display screen 50 shown in FIG. 7 thereby specifying the name of the file to be transferred. The user then clicks a radio button 53a to specify the current day or a radio button 53b to specify a future day as the updating date. When a future day is specified, the updating date is then input into year, month, and day fields 54a-54c. Finally, a transfer button 52 labeled "TRANSFER HTML FILE" is clicked to transfer the specified HTML file to the WWW server 1.

As described above, a window displayed on the screen of the personal computer 4 includes, in addition to those fields of the WWW browser shown in FIG. 6, the radio buttons 53a and 53b used to select either the current day or a future day as the date of updating a Web page, and year, month, and day fields 54a-54c used to input the updating date of an HTML file in the case where the updating date is a future day.

When an HTML file is to be updated immediately after transmission of the HTML file, the radio button 53a is clicked to specify the current time as the updating date, and the name of the HTML file (index.html, for example) to be uploaded is input into the file name field 51. Finally, the transfer button 52 labeled "TRANSFER HTML FILE" is clicked to transfer the specified HTML file to the WWW server 1.

Upon reception of the HTML file (index.html, for example), the WWW server 1 overwrites the existing HTML file (index.html, for example) stored in a predetermined directory with the received HTML file in accordance with a predetermined file updating CGI program.

Furthermore, in accordance with the predetermined file updating CGI program, the WWW server 1 adds a numeric character string representing the current date and time at the end of the file name of the received HTML file (index.html), and saves the HTML file having the file name with the added numeric character string representing the date and time as a backup file in a predetermined backup directory.

The directories open to users can be freely accessed via the Internet 3 to read data stored therein. On the other hand, access to the backup directories is limited so that only a manger of the WWW server 1 is allowed to access the backup directories but ordinary users are not allowed to directly access the backup directories via the Internet 3. The directories open to users and the backup directories are formed in different directories on a single or plural HDDs 19.

In the case where it is desired to update an HTML file at a future time after the time at which the HTML is transferred, the radio button 53b is clicked to select a future updating date. In this case, a specific updating date is input into year, month, and day fields 54a-54c, and then the transfer button labeled "TRANSFER HTML FILE" is clicked to transfer the specified HTML file to the WWW server 1. In response, the personal computer 4 transfers to the WWW server 1 the HTML file together with the data indicating the date when the HTML file should be updated.

In this case, the WWW serer 1 does not immediately update the existing HTML file (index.html, for example) stored in a predetermined directory open to users, but the WWW server 1 adds a numeric character string representing the specified updating date and time at the end of the file name of the received HTML file (index.html, for example) and saves the HTML file having the file name with the added numeric character string representing the date and time as a backup file in a predetermined backup directory in accordance with the predetermined file updating CGI program.

FIG. 8 illustrates a source of an HTML file used to display the file updating screen on the WWW browser of the personal computer 4, as shown in FIG. 7.

Figure 9:
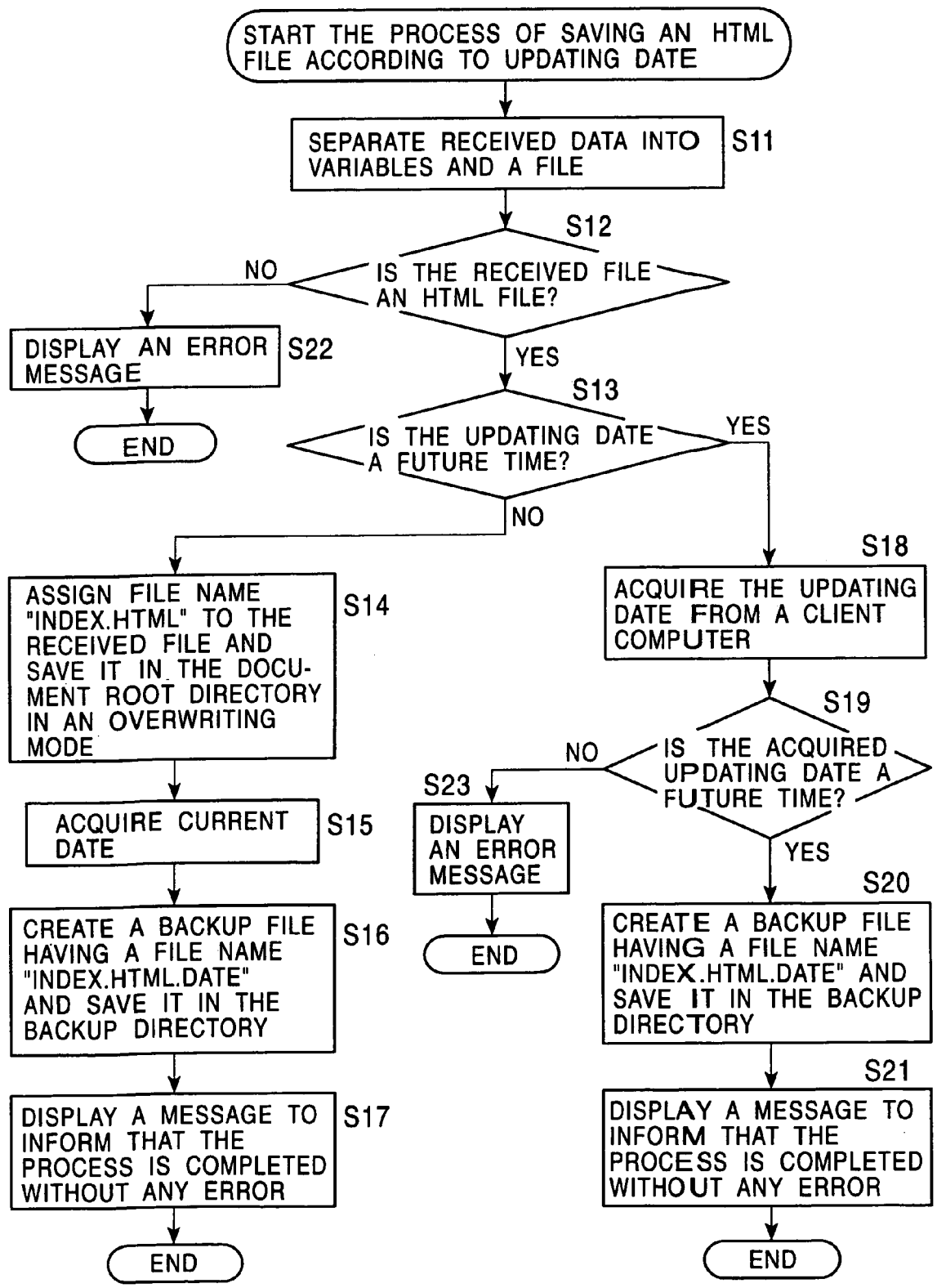
FIG. 9 is a flow chart illustrating a process performed by a WWW server to back up an HTML file using a CGI program, according to the present invention.

An operation performed by the WWW server 1 to back up an HTML file (index.html) using a CGI program is described below with reference to the flow chart shown in FIG. 9.

Herein it is assumed that the URL of the WWW server 1 is "http://www.test.com/", the URL of an updating Web page shown in FIG. 7 is "http://www.text.com/update.html", the URL of an updating CGI program is "http://www.test.com/cgi-bin/update.cgi", the directory (document root directory) of the WWW server 1 open to user is "/www/data/", the file name of an HTML file to be updated is "index.html", and the backup directory is "/www/data/backup/".

In step S11, the WWW server 1 separates the data received from the personal computer 4 into variables and a file. Then in step S12, the WWW server 1 determines whether or not the received file is an HTML file. If it is determined that the received file is an HTML file, the process goes to step S13. In step S13, the WWW server 1 determines on the basis of the variables separated in step S11 whether or nor the specified updating date and time of the file are a future date and time.

If it is determined in step S13 that the updating date and time of the file are not a future date and time, that is, if the file should be updated immediately, then the process goes to step S14. In step S14, the WWW server 1 writes the received HTML file (index.html) into a predetermined document root directory (/WWW/data/) open to the user thereby overwriting the existing HTML file (index.html) stored therein.

In step S15, the WWW server 1 acquires the current date and time from an RTC (real time clock) or a time counting program.

Thereafter, in step S16, the WWW server 1 adds a numeric character string representing the current date and time acquired in step S15 at the end of the file name of the received HTML file (index.html), and saves the HTML file having the file name with the added numeric character string representing the date and time as a backup file in a predetermined backup directory (/WWW/data/backup/).

For example, if the current date and time in year/month/day/hour/minute/ is 1999/4/1/16/12, then the file is named "index.html.1999.4.1.16.12". This file having the same content as the HTML file "index.html" is then automatically saved as a backup file.

In step S17, the WWW server 1 sends a message to the personal computer 4 to inform that the file has been successively updated. Thus, the process is completed.

In the case where it is determined in step S13 that the specified updating date and time of the file are a future date and time, the process goes to step S18. In step S18, the WWW server 1 acquires the specified updating date and time (described by one of the variables separated in step S11) of the HTML file received from the client computer 4.

In step S19, the WWW server 1 determines whether or not the specified updating date and time acquired in step S18 are a future date and time. If it is determined that the specified updating date and time acquired in step S18 are a future date and time, the process goes to step S20. In step S20, the WWW server 1 adds a numeric character string representing the specified updating date and time acquired in step S18 at the end of the file name of the received HTML file (index.html), and saves the HTML file having the file name with the added numeric character string representing the date and time as a backup file in the predetermined backup directory (/WWW/data/backup/).

For example, if the specified updating date and time in year/month/day/hour/minute/ is 1999/4/2/18/24, then the file is named "index.html.1999.4.2.18.24". This file, having the same content as the HTML file "index.html", is then automatically saved as a backup file.

Thereafter in step S21, the WWW server 1 sends a message to the personal computer 4 to inform that the file has been successfully accepted. Thus, the process is completed.

In the case where it is determined in step S19 that the specified updating date and time acquired in step S18 are not future date and time, the received date is invalid. In this case, the process goes to step S23, and the WWW server 1 sends an error message to the personal computer 4. The error message is displayed on the personal computer 4, and the process is terminated.

In the case where it is determined in step S12 that the format of the received file is not valid, that is, the received file is neither an HTML file nor an image file linked to an HTML file, the WWW server 1 cannot handle the received file. In this case, the process goes to step S22, and the WWW server 1 sends an error message to the client computer 4. The error message is displayed on the client computer 4, and the process is terminated.

Thus, in the above process, the file having the same content as the original HTML file (index.html) and having the file name added with the date and time at which the file has been updated or will be updated is automatically saved as a backup file in the backup directory (/WWW/data/backup/) of the WWW server 1.

As a result, in the backup directory (/WWW/data/backup/) of the WWW server 1, there will be backup files having, for example, following file names:

"index.html.1998.4.23.18.54",
"index.html.1998.5.5.23.15",
"index.html.1998.7.1.0.0", and
"index.html.1999.12.24.23.59".

In the backup file saving process in step S16 or S20 described above, only the data representing the difference between the new version of the HTML file and the old version of the HTML file may be stored in the backup directory (/WWW/data/backup/). This allows a reduction in the capacity of the HDD 19 required to store the backup files.

Figure 10:
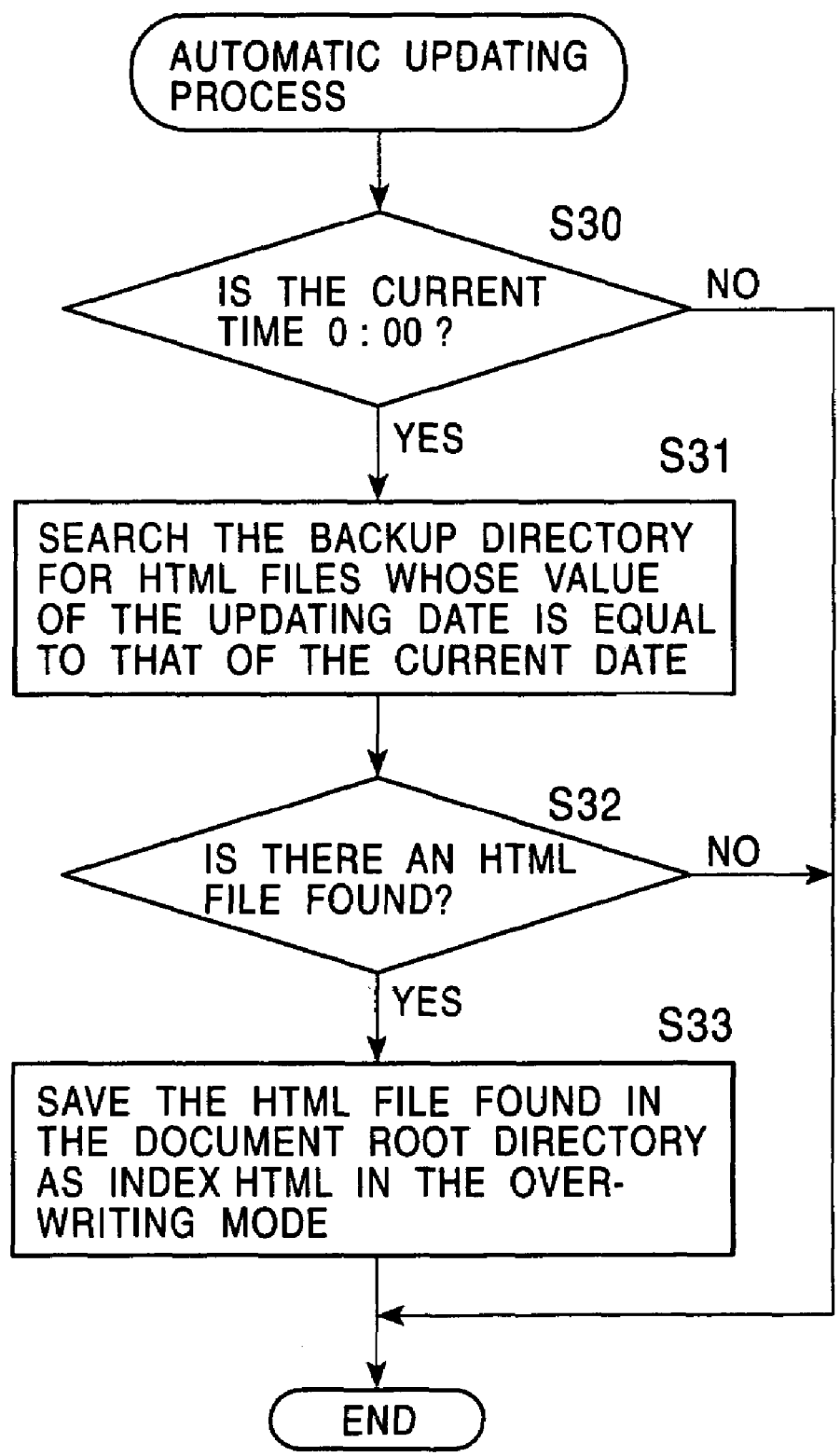
FIG. 10 is a flow chart illustrating a process performed by a WWW server to automatically update an HTML file at a specified time, according to the present invention.

A process performed by the WWW server 1 to automatically update an HTML file on the specified updating date is described below with reference to FIG. 10.

The WWW server 1 performs the updating process in accordance with an automatic file updating program such as that called "cron". In step S30 in FIG. 10, the WWW server 1 watches the current time, and when a predetermined time (0:0, for example) of each day has come, the process goes to step S31. In step S31, the backup directory (/WWW/data/backup/) is searched for HTML files which should be updated on the current day, on the basis of the numeric character string indicating the updating date added at the end of each HTML file.

If it is determined in next step S32 that an HTML file which should be updated on the current day is found, then in the following step S33, the existing HTML file (index.html) stored in the predetermined document root directory (/WWW/data/) open to users is replaced with the HTML file found.

Thus, at the predetermined time of each day, Web pages are automatically updated on the basis of the HTML files stored in the backup directory (/WWW/data/backup/).

When a user of the client personal computer 2 wants to read an old version of a Web page stored in the WWW server 1, the user can access it as follows.

Figure 11:
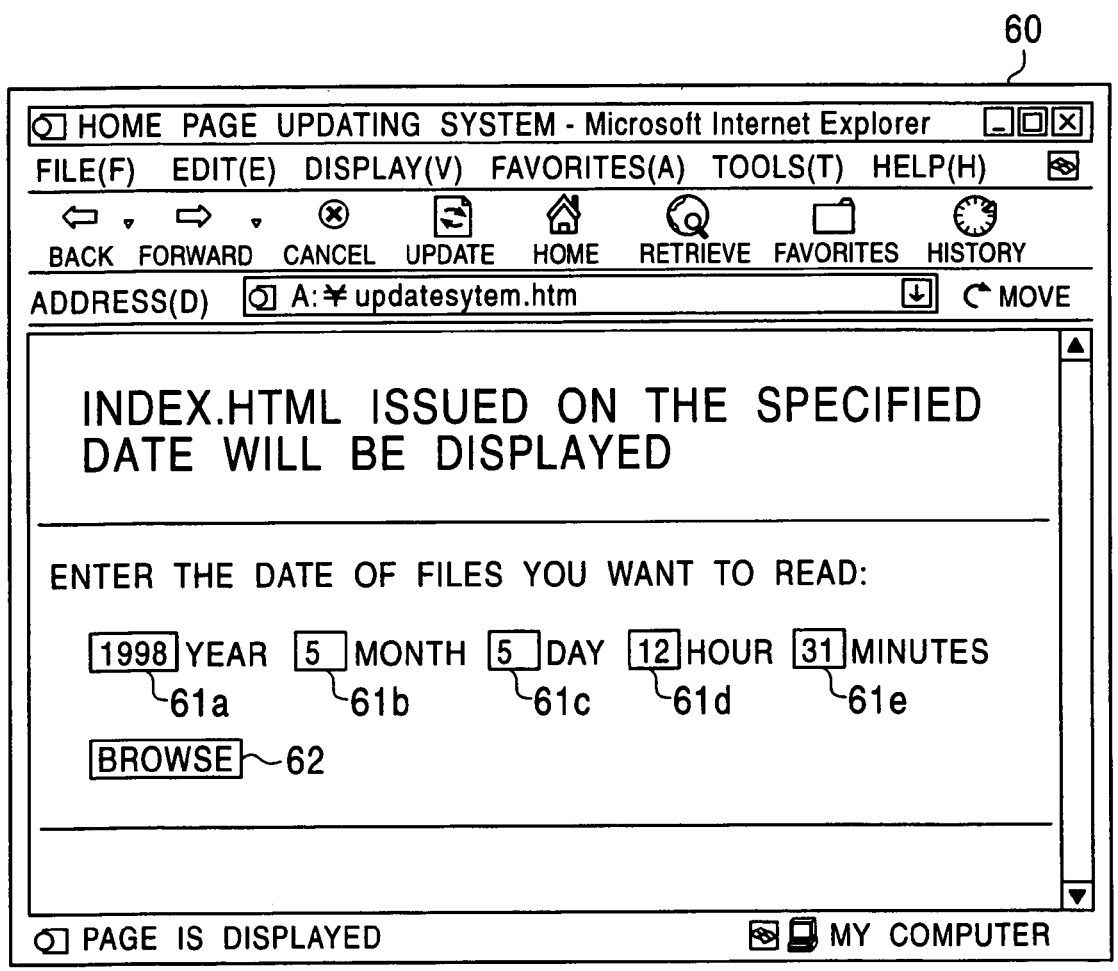
FIG. 11 illustrates a screen which is displayed on a personal computer when requesting information of a desired date and time, according to the present invention.
Figure 13:
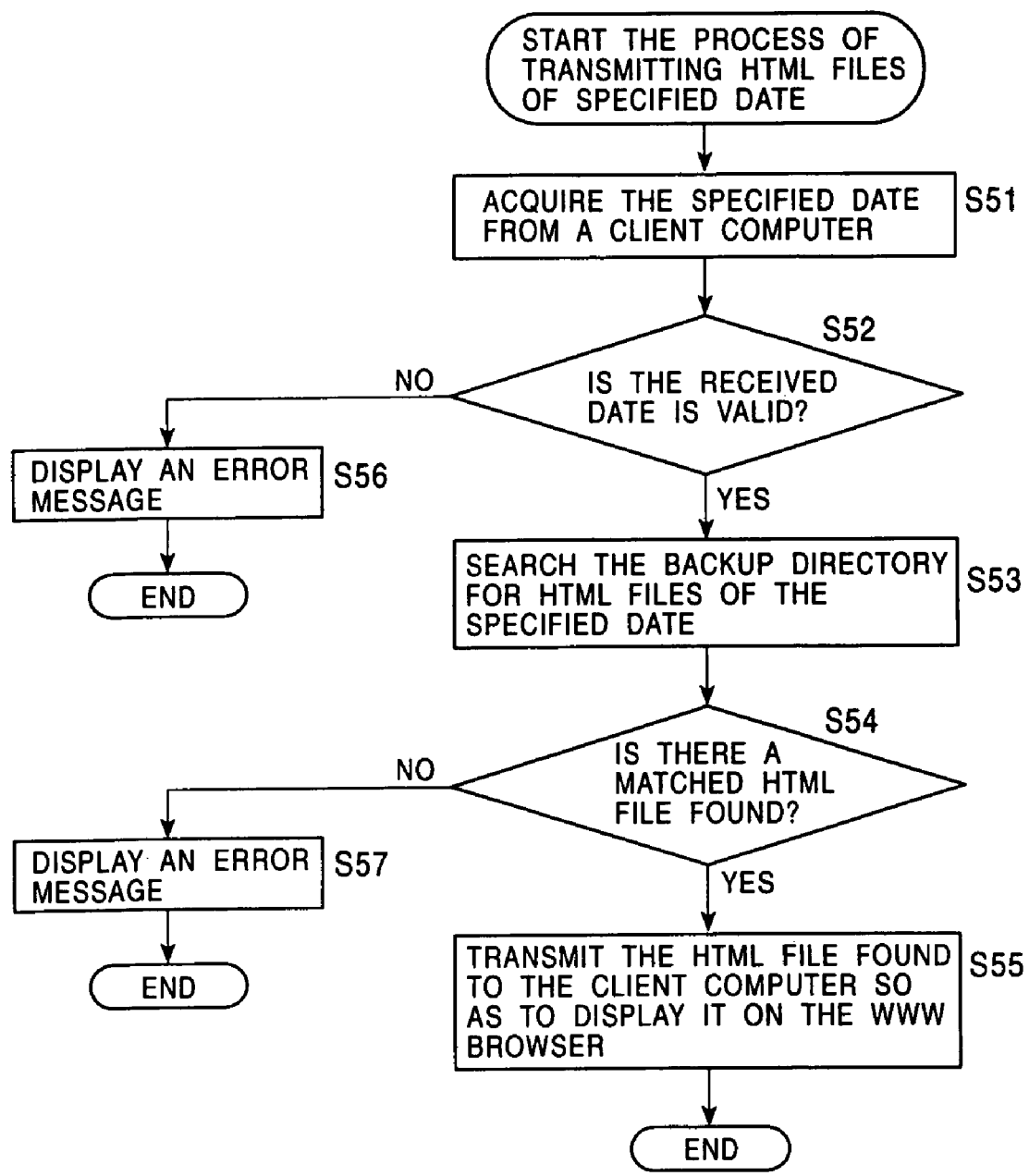
FIG. 13 a flow chart illustrating a process performed by a WWW server to retrieve an HTML file using a CGI program.

Herein it is assumed that the URL of the WWW server 1 is "http://www.test.com/", the URL of a retrieving Web page shown in FIG. 11 is "http://www.text.com/pageview.html", the URL of a retrieving CGI program is "http://www.test.com/cgi-bin/pageview.cgi", the directory (document root directory) of the WWW server 1 open to user is "/www/data/", the file name of an HTML file to be read is "index.html", and the backup directory is "/www/data/backup/".

First, a URL "http://www.test.com/pageview.html" is input in the WWW browser running on the client personal computer 2 so as to display the retrieving Web page as shown in FIG. 11.

The display screen 60 of the retrieving Web page includes date and time fields 61a-61e used to specify the date and time of a desired Web page which was laid open in the past. After inputting a particular date and time into the fields 61a-61e, if a user of the client personal computer clicks a browse button 62 labeled "BROWSE", then data indicating the specified date and time is sent to the WWW server 1.

FIG. 12 illustrates a source of an HTML file used to display the updating screen of the WWW browser running on the personal computer 4 as shown in FIG. 11.

Upon reception of the data specifying the date and time from the client personal computer 2, the WWW server 1 retrieves HTML files having file names whose date and time closest to the specified date and time and sends HTML files found to the client personal computer 2. Thus, the user of the client personal computer 2 can browse Web pages which was laid open in past periods simply by inputting a desired date and time into the date and time fields 61a-61e.

A process performed by the WWW server 1 to present a Web page corresponding to data specifying a date and time received from the personal computer 4 in accordance with a predetermined retrieving procedure using a CGI program is described below with reference to the flow chart shown in FIG. 12.

In step S51, under the control of the CPU 11 of the WWW server 1, the communication board 21 receives data indicating a date and time sent from the personal computer 2 via the network 3. In step S52, the CPU 11 of the WWW server 1 determines whether or not the date and time received from the personal computer 2 are valid. If it is determined that the date and time received from the personal computer are valid, then the process goes to step S53 to search the directory "/WWW/data/backup/" for files which match the specified date and time.

More specifically, in step S53, when there is a file having the same date and time as the specified date and time, that file is selected. If there is no file having the same date and time as the specified date and time, a file is selected whose date and time are closest to but prior to the specified date and time. However, if the specified date and time are prior to the date and time when information was laid open, the WWW server 1 returns an error message to inform that the requested file is not available.

More specifically, the CPU 11 of the WWW server 1 removes "index.html" from file names of candidate file names and converts the remaining character string of each file name using a function such as timelocal available in a computer language such as perl. On the basis of the converted character string, the CPU 11 calculates the time in sec of the file with respect to, for example, 1970:1:1:0:0. The CPU 11 of the WWW server 1 also performs a similar process upon the character string of the date and time received from the personal computer 2 to determine the time in sec. On the basis of these values, the CPU 11 of the WWW server 1 selects a file whose date and time are closest to the specified date and time.

In step S54, the CPU 11 of the WWW server 1 determines whether or not a file satisfying the above condition has been found in the retrieval performed in step S53. If it is determined that a file has been found, then the process goes to step S55. In step S55, the CPU 11 of the WWW server 1 transmits the file found to the WWW browser of the personal computer 2 via the communication board 21. Thus, information corresponding to the specified date and time is displayed on the personal computer 2, and the process is completed.

In the case where it is determined in step S54 that there is no file satisfying the above condition, the process goes to step S57. In step S57, the CPU 11 of the WWW server 1 transmits an error message to the personal computer 2 via the communication board 21. The error message is displayed on the client personal computer 2, and the process is terminated.

If it is determined in step S52 that the date and time received from the personal computer 2 are not valid (for example, 13th month is specified), the process goes to step S56. In step S56, the CPU 11 of the WWW server 1 transmits an error message to the personal computer 2 via the communication board 21. The error message is displayed on the client personal computer 2, and the process is terminated.

Thus, the WWW server 1 supplies information corresponding to the specified date and time to the personal computer 2.

For example, when files having the following names are stored in the backup directory (/WWW/data/backup/) of the WWW server 1, "index.html.1998.4.23.18.54",
"index.html.1998.5.5.23.15",
"index.html.1998.7.1.0.0", and
"index.html.1999,12.24.23.59", if the specified date and time are 4/23, 1998 and 18:54, the WWW server 1 transfers an HTML file having a file name "index.html.1998.4.23.18.54" to the client personal computer 2.

In the case where information is updated such that the WWW server 1 stores only difference data with respect to old versions of HTML file into the backup directory, the WWW server 1 produces an old version of the HTML file corresponding to the specified date and time from the newest version of the HTML file and the difference data and supplies it to the personal computer 2.

Thus, even when the content of a Web page is updated very frequently as is the case with a news page, users can retrieve and read a desired Web page laid open on any date in the past, as if Web pages were paper media such as a newspaper.

If the method of supplying information according to the present invention is used as a home page updating tool, it becomes possible to refer to any old version of a home page. Furthermore, a user can produce a new version of the home page before updating it and can upload it together with data specifying the updating date so that the home page will be automatically updated at the specified updating date.

Although in the embodiments described above, a single HTML file is dealt with, a plurality of HTML files may also be dealt with. More specifically, the WWW server 1 may update a plurality of HTML files, the client personal computer 2 may specify a plurality of files to be read, and the CGI program of the WWW server 1 may process a plurality of HTML files.

Furthermore, the present invention is not limited to files according to the HTML format. The present invention may also be applied to image files according to the GIF (Graphics Interchange Format) or JPEG (Joint Photographic Experts Group) format, audio or music files, program files, and any other file which can be connected to an HTML file.

Referring now to FIG. 14, there is described a medium used to install an information supplying program so that the process including the steps described above can be executed on a computer.

Figure 14A:
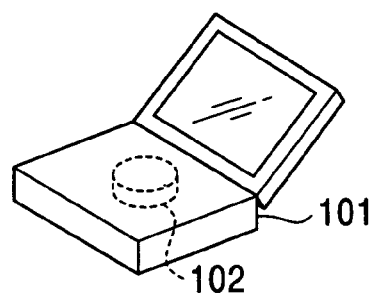
FIG. 14 is a schematic diagram illustrating various types of media.

One method of providing the information supply program to a user is to install it in advance on a hard disk 102 (corresponding to the hard disk located inside the hard disk drive 19 shown in FIG. 2) serving as a storage medium disposed inside a personal computer 101, as shown in FIG. 14A.

Figure 14B:
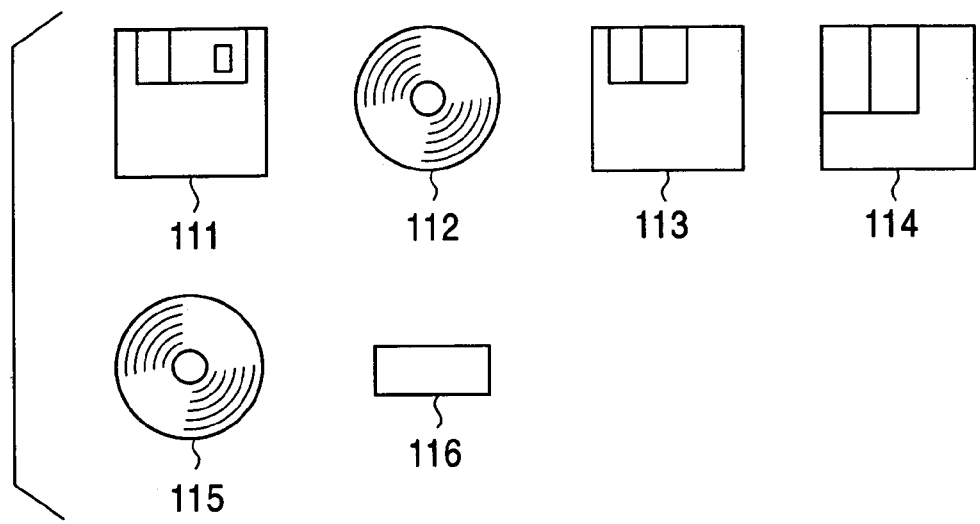

Alternatively, the information supplying program may be provided in the form of package software stored, temporarily or permanently, on a storage medium such as a floppy disk 111, a CD-ROM 112, an MO disk, 113, a DVD 114, a magnetic disk 115, or a semiconductor memory 116, as shown in FIG. 14B.

Figure 14C:
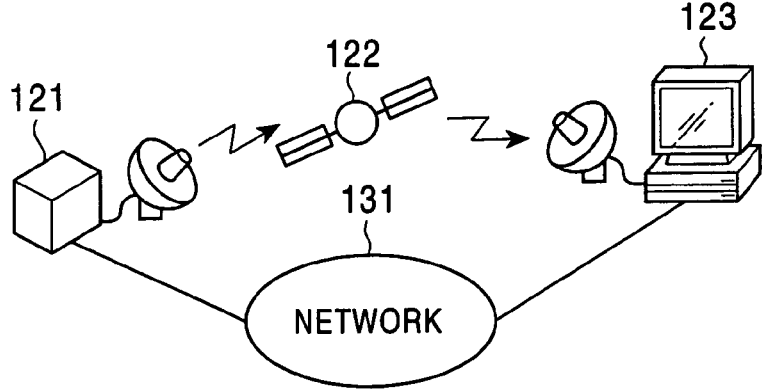

Still alternatively, as shown in FIG. 14C, the program may also be transferred to a personal computer 123 from a downloading cite 121 by means of radio communication via a satellite 122, or by means of wire communication or wireless communication via a network 131 such as a local area network or the Internet, thereby downloading the image displaying processing program onto a hard disk disposed in the personal computer 123.

In the present invention, the term "medium" is used in a broad sense to describe all types of media.

Furthermore, in the present invention, steps of the program supplied via a medium may be executed either in a serial fashion or in a parallel fashion with respect to time, or may be executed separately.

Furthermore, in the present invention, the term "system" is used to describe the entire system including a plurality of apparatus.

As described above, in the information supplying method, the storage medium on which the information supplying program is stored, and the information supplying apparatus according to the present invention, data stored in an open storage area allowed to be freely accessed via a network is replaced with update data at a specified time. A file name used as a key when being retrieved is created by adding data representing the updating time at the end of the original file name of the update data. The created file name serving as a key in retrieval is assigned to backup data created from the update data, and the backup data is stored in a retrieval storage area. In response to a request issued by a client via the Internet, the WWW server retrieves backup data having a file name corresponding to the specified date and time from the retrieval storage area and transfers the retrieved backup data to the client. Backup files of Web pages which were laid open in the past and those which will be laid open in the future are automatically created and stored in the WWW server so that any Web page can be presented to a client in response to a request issued by the client.

What is claimed is:

1. An information supplying apparatus including a programmed computer comprising:

a data updating means for replacing data stored in an open storage area, which is allowed to be freely accessed via a network, with update data at a specified time;

a data backing-up means for producing a retrieval file name by adding data, which represents a date and time when updating is to be performed, to a file name of said update data, assigning said retrieval file name to the backup data produced from said update data to form a backup retrieval file, and saving said backup retrieval file in a retrieval storage area; and a retrieving means for responding to a client request over the network specifying a date and time to search said retrieval storage area for the backup retrieval file having the retrieval file name exactly corresponding to the date and time of the client request and, if no exact match for the date and time corresponding to the client request is found, to search said retrieval storage area for the backup retrieval file having the retrieval file name with a date and time that are closest to the date and time corresponding to the client request while also being prior to the date and time corresponding to the client request, and to retrieve and transfer backup retrieval file data corresponding to a result of the search via said network to a the requesting client.

2. The information supplying apparatus according to claim 1, wherein said programmed computer further comprising:

an automatic updating means for retrieving a backup retrieval file having the retrieval file name and the added data representing an updating time coincident with the at a predetermined time of each day corresponding to the specified time at a predetermined time from said retrieval storage area, and for replacing the data stored in the open storage area by overwriting the data stored in the open storage area with update data having the retrieval file name retrieved at the predetermined time into said open storage area.

* * * * *

UNITED STATES PATENT AND TRADEMARK OFFICE
CERTIFICATE OF CORRECTION

PATENT NO. : 7,260,619 B2
APPLICATION NO. : 11/081599
DATED : August 21, 2007
INVENTOR(S) : Michiaki Yoneda Page 1 of 1

It is certified that error appears in the above-identified patent and that said Letters Patent is hereby corrected as shown below:

Column 1, line 18, change "net work" to --network--;

line 35, "files" to --file--.

Column 4, line 19, change "lined" to --linked--.

Column 6, line 42, change "manger" to --manager--.

Column 9, line 33, change "was" to --were--.

Column 12, line 38, change "to a the" to --to the--, line 45, "with the at a" to --with a--.

Signed and Sealed this

First Day of July, 2008

JON W. DUDAS
*Director of the United States Patent and Trademark Office*